United States Patent [19]

Phelps et al.

[11] Patent Number: 4,511,666

[45] Date of Patent: Apr. 16, 1985

[54] PROCESS FOR PRODUCING BETA'-SILICON ALUMINUM OXYNITRIDE (B'-SIALON)

[75] Inventors: Frankie E. Phelps, Lower Burrell; Paul J. Boget; Robert L. Troup, both of Murrysville, all of Pa.

[73] Assignee: Aluminum Company of America, Pittsburgh, Pa.

[21] Appl. No.: 450,337

[22] Filed: Dec. 16, 1982

[51] Int. Cl.³ ............................................. C04F 35/56
[52] U.S. Cl. ...................................... 501/98; 501/97; 501/10; 423/327; 264/122
[58] Field of Search ............................ 501/10, 97, 98; 264/122; 423/327

[56]  References Cited

U.S. PATENT DOCUMENTS

| 3,837,871 | 9/1974 | Weaver | 501/98 |
| 3,903,230 | 9/1975 | Kamigaito et al. | 264/122 |
| 3,960,581 | 6/1976 | Cutler | 501/98 |
| 3,991,166 | 11/1976 | Jack et al. | 423/327 |

OTHER PUBLICATIONS

Jack, K. H., "Review: SiAlONs and Related Nitrogen Ceramics", J. Material Sciences, 11, pp. 1135–1158, 1976.

*Primary Examiner*—Veronica O'Keefe
*Attorney, Agent, or Firm*—Max L. Williamson

[57]  ABSTRACT

A process for producing a refractory material comprising essentially beta'-SiAlON wherein initial reactants comprising $Al_2O_3$ and $SiO_2$ are nitrided for sufficient times and temperatures to convert at least a portion of the initial reactants to at least a portion of effective reactants and the effective reactants are then further heated to produce an essentially beta'-SiAlON refractory material.

10 Claims, 2 Drawing Figures

PROCESS FOR PRODUCING BETA'-SILICON ALUMINUM OXYNITRIDE (B'-SIALON)

BACKGROUND

This invention relates to a process for making a silicon aluminum oxynitride refractory material, and more particularly a process wherein at least a portion of initial reactants are converted to at least a portion of effective reactants in a first heating step in the presence of nitrogen and effective reactants are converted to a silicon aluminum oxynitride refractory material in a second heating step.

Silicon aluminum oxynitride refractory materials, and more particularly materials in the $Si_3N_4$-$AlN$-$Al_2O_3$-$SiO_2$ system, are of ever-increasing interest for refractory applications. For ease of identification, compositions within this system are referred to as SiAlON, and a number of different phases of SiAlON have been produced and identified. For example, Jack et al U.S. Pat. No. 3,991,166 describes one phase and methods of making it, the phase having the general formula $Si_{6-z}Al_zO_zN_{8-z}$ where z is greater than zero and less than or equal to five. Various compositions within the bounds of the general formula taught by Jack et al may be produced, and each has a crystalline structure similar to beta-$Si_3N_4$ and is consequently identified as beta'-SiAlON. Beta'-SiAlON can be defined as a solid solution of $Al_2O_3$ within a matrix of $Si_3N_4$. The compositional limits of reactants, referred to as effective reactants, to produce beta'-SiAlON may be seen by referring to FIG. 2. The compositional amounts of $Si_3N_4$, AlN and $Al_2O_3$ for any beta'-SiAlON formulation may be determined by referring to line AB which is a plot of the compositions of the aforesaid compounds to produce a beta'-SiAlON having the general formula $Si_{6-z}Al_zO_zN_{8-z}$ where z is greater than zero and less than or equal to five.

Another phase, known as y-phase SiAlON represented by the formula $SiAl_4O_2N_4$, is described in an article entitled "Review: SiAlONs and Related Nitrogen Ceramics", published in *Journal of Material Sciences*, 11, (1976) at pages 1135–1158. Compositions of SiAlON within a given phase and from phase to phase demonstrate varying characteristics, for example, variances in density, which effect their preferential use in a given application.

Thus far, of all the SiAlON materials, the beta'-SiAlONs have generated the greatest interest because their refractory properties and corrosion resistance characteristics are comparable to other nitride refractories such as silicon nitride and silicon oxynitride. Beta'-SiAlON compositions offer a distinct advantage over silicon nitride and silicon oxynitride for making a refractory, however, because some of the compositions of beta'-SiAlON material can be used to produce a high density refractory by conventional sintering techniques. To produce high density refractories from silicon nitride or silicon oxynitride requires the use of pressure sintering techniques.

A number of processes for making silicon aluminum oxynitride refractories and refractory materials have been suggested. Weaver U.S. Pat. No. 3,837,871 describes a method for producing a product having a substantial amount of what the patentee believes to be the quaternary compound silicon aluminum oxynitride which has a structure similar to that of beta $Si_3N_4$ but with an expanded lattice structure. Weaver's method of making the described product is hot pressing $Si_2ON_2$ (silicon oxynitride) in the presence of varying amounts of aluminum.

Kamigaito et al U.S. Pat. No. 3,903,230 describes a method of making a silicon aluminum oxynitride ceramic by sintering or hot pressing a mixture of finely divided powders of silicon nitride, alumina and aluminum nitride.

Cutler U.S. Pat. No. 3,960,581 describes a process for producing SiAlON by reacting silicon and aluminum compounds in the presence of carbon and nitrogen. Cutler teaches and stresses the importance of using a reactant material having the silicon and aluminum compounds intimately combined prior to nitriding in order that aluminum oxide is intimately dispersed throughout silicon nitride in the final product. Suggested reactant materials are clay, rice hulls having a solution containing a dissolved aluminum salt absorbed therein, and a precipitate of aluminum and silicon salts. In each case Cutler emphasizes that the silicon and aluminum compound reactants are intimately combined prior to nitriding to produce SiAlON. Further, in the process as taught by Cutler excess carbon and unreacted silicon dioxide must be removed from the mixture after the mixture is nitrided.

Jack et al U.S. Pat. No. 3,991,166 describes a beta'-SiAlON product produced by sintering a mixture of alumina or a compound which decomposes to produce alumina and silicon nitride. Another method of producing beta'-SiAlON as described by Jack et al is nitriding silicon powder in the presence of alumina powder.

It may be noted that several of the foregoing processes employ silicon nitride or silicon oxynitride as reactants. Neither of these compounds is found in nature and they are relatively expensive to produce. Cutler's process provides for the use of reactants found in nature but does not employ a two-step heating process in producing beta'-SiAlON.

It would be advantageous, therefore, to provide a process whereby readily available and relatively inexpensive initial reactant materials comprising $Al_2O_3$ and $SiO_2$ are nitrided to make silicon aluminum oxynitride materials without the necessity of further processing in removing excess carbon and/or silica.

BRIEF SUMMARY OF THE INVENTION

Discrete particles of silica, alumina and carbon may be used as initial reactants in producing essentially beta'-SiAlON. For purposes of this invention, a material which is essentially beta'-SiAlON is intended to mean a material having approximately 80% or more of beta'-SiAlON therein. Alternatively, compounds which yield silica or alumina under the temperatures employed in the practice of this invention may be used as sources of silica or alumina. Such sources include silicates such as quartz, cristabolite, tridymite and amorphous silica as silica sources, for example, and aluminum carbonate, aluminum nitrate, aluminum hydroxide or gibbsite (aluminum trihydrate), for example, as alumina sources. References hereinafter to silica ($SiO_2$) and alumina ($Al_2O_3$) are intended to include, but are not limited to, the foregoing materials cited as examples. A process for producing beta'-SiAlON from discrete particles of $Al_2O_3$ and $SiO_2$ is the subject of an application for a U.S. patent by Phelps et al filed concurrently herewith. Other initial reactants may include sources of silicon dioxide and aluminum oxide as disclosed in Cutler U.S.

Pat. No. 3,960,581, the disclosure of which is hereby incorporated by reference.

If the initial reactants are discrete particles, they are mixed to uniformly distribute the particles throughout the mixture and the mixture is then combined with enough water to plasticize the mixture for forming into shapes. If the initial reactants are intimately combined, as disclosed in U.S. Pat. No. 3,960,581, the reactants are simply finely ground if necessary to adapt the reactants for forming. Forming may be by extruding or other molding methods familiar to those skilled in the art to shape the mixture into pellets. The pellets are then nitrided to convert the initial reactants into transitory or effective reactants, and in a further heating step in a nitrogen atmosphere, the effective reactants are converted to beta'-SiAlON.

It is an object of the invention to provide a method of producing beta'-SiAlON from economical, readily available initial reactants comprising $Al_2O_3$ and $SiO_2$.

This and other objects and advantages will be more fully understood and appreciated with reference to the following description and associated drawings.

DESCRIPTION OF A PREFERRED EMBODIMENT

Figure 1:
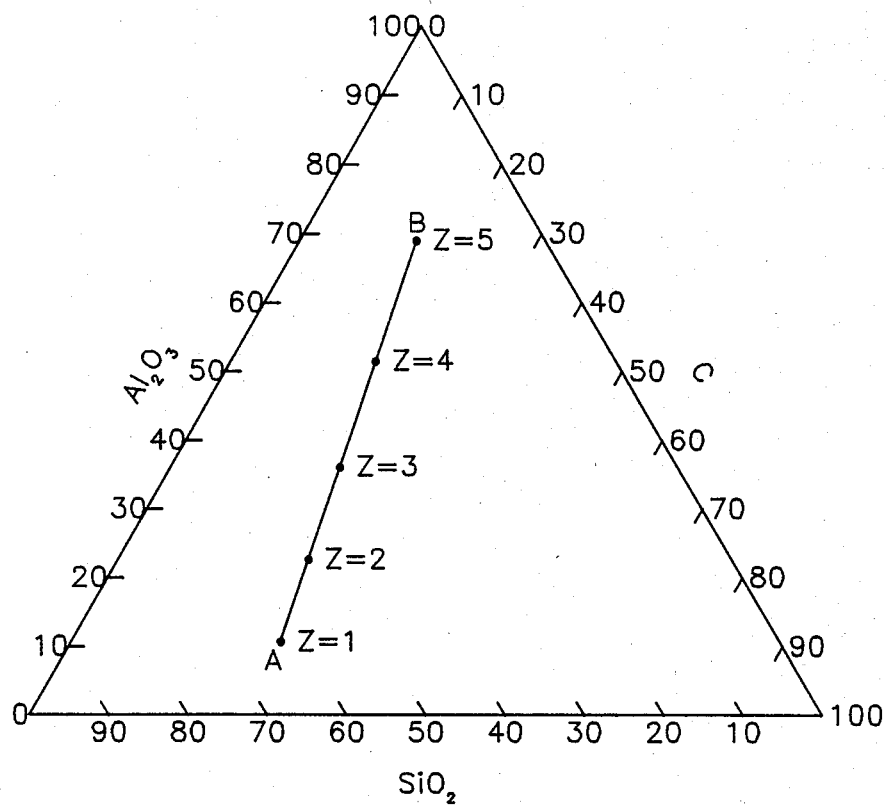
FIG. 1 is a graph showing the compositional limits of the initial reactants to produce beta'-SiAlON by a process of this invention.
Figure 2:
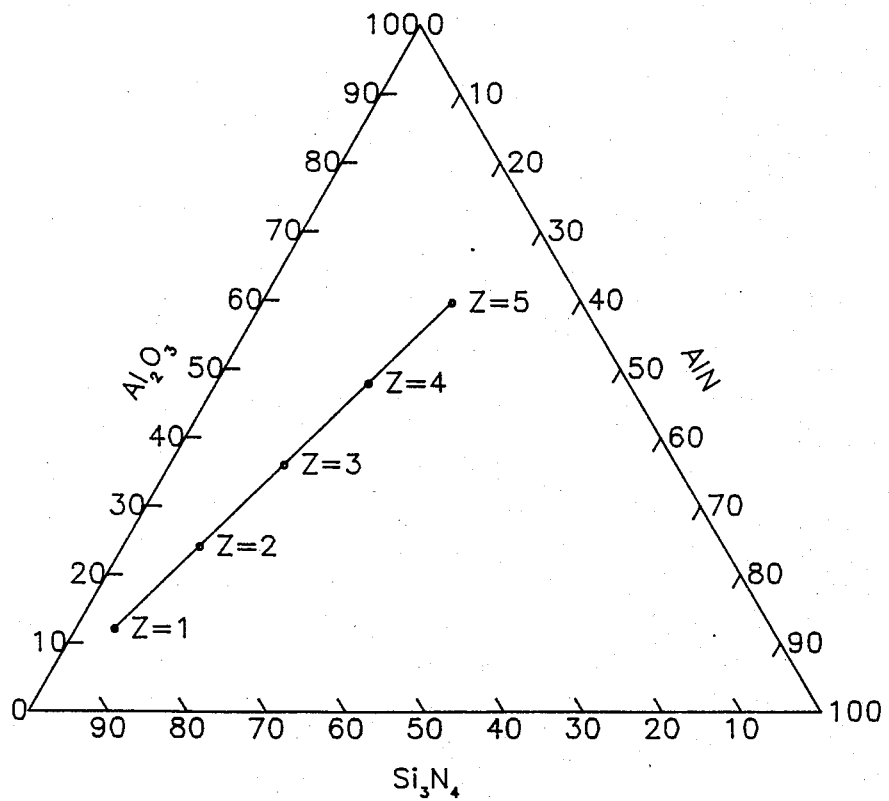
FIG. 2 is a graph showing the compositional limits of transitional or effective reactants to produce beta'-SiAlON by a process of this invention.

As has been noted previously, beta'-SiAlON may be defined as a solid solution of $Al_2O_3$ within an $Si_3N_4$ matrix and is represented by the general formula $Si_{6-z}Al_zO_zN_{8-z}$ where z is greater than zero and less than or equal to five. To produce beta'-SiAlON by a process of this invention, initial reactants $Al_2O_3$, $SiO_2$ and C are provided in compositional ratios as indicated by the line AB in FIG. 1. To produce a beta'-SiAlON when $z=2$ with a formula of $Si_2AlON_3$, for example, would require 23% by weight $Al_2O_3$, 24% by weight C and 53% by weight $SiO_2$. Although not essential, it is advantageous to add iron in a form such as $Fe_2O_3$ as a catalyst in promoting the formation of beta'-SiAlON. It is believed that oxides of other transitional metals such as nickel, chrome or manganese, for example, may also be used as catalysts in the practice of this invention. Only a small percentage of catalyst, such as 2% for example, is added.

The $SiO_2$, $Al_2O_3$ and C initial reactants are mechanically mixed by any suitable mixing method to uniformly blend the particles, if necessary. The particles are then combined with enough water by mixing either during blending or subsequent thereto, preferably subsequent thereto, to render the mixture plastic for extruding or other molding methods familiar to one skilled in the art to produce a pellet suitable for nitriding. The particle size of the reactants may vary, but generally, the smaller the particle size, the more complete the reaction when fired, as will be discussed later. The preferred median particle size of $Al_2O_3$ is less than 3.5 microns and preferably less than 0.5 micron. The preferred $SiO_2$ source is fumed silica having a median particle size of 0.1 micron.

After mixing and molding the initial reactants into pellets, the pellets are dried at a low temperature, such as 110° C., for example, to drive off any excess moisture.

The pellets are then charged into a reaction chamber adapted to nitride and heat the pellets in a two-stage heating cycle. Nitrogen may be provided as a gas or a compound, such as ammonia, for example, that will reduce to nitrogen gas at the reaction temperature. It is preferred that the nitrogen be provided continuously under a positive pressure to insure that the nitrogen will uniformly contact all of the reactants during the reaction cycle. A suitable reactor to accomplish the above purposes is a fluid bed reactor or packed bed reactor provided with a nitrogen gas dispersing means near the bottom of the reactor and a nitrogen and off-gas outlet near the top. After charging a first charge of pellets into the reactor into an upper heat zone to form a suitable bed, nitrogen is dispersed through the bed under a positive pressure to purge the reactor of its normal atmosphere.

After establishing a nitrogen atmosphere within the reactor, temperature of the reactants is elevated by a suitable heating means to a temperature of at least 1200° C., preferably at least 1400° C. in the upper heating zone of the reactor. It is believed that by maintaining the reactants at a given temperature of at least 1200° C. for a sufficient period of time, a portion of the initial reactants are reduced to a portion of the effective reactants necessary for producing beta'-SiAlON. The period of time required to accomplish this initial reaction will vary with the temperature employed. It has been discovered that heating at a temperature of 1400° C. for 1½ hours, for example, is sufficient to accomplish the initial reaction in the process.

It is believed that the above-described initial nitriding step yields $Si_3N_4$, AlN and CO as off-gas and may be represented by the equations:

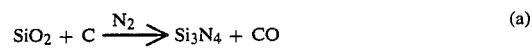

$$SiO_2 + C \xrightarrow{N_2} Si_3N_4 + CO \qquad (a)$$

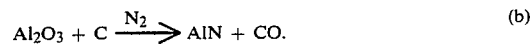

$$Al_2O_3 + C \xrightarrow{N_2} AlN + CO. \qquad (b)$$

It may be noted that in addition to $Si_3N_4$ and AlN, $Al_2O_3$ is also required as an effective reactant in producing beta'-SiAlON, and $Al_2O_3$ is provided in a quantity in excess of the amount needed for production of the necessary AlN so that a portion of the $Al_2O_3$ remains as an effective reactant after the initial reaction.

Following the above-described initial nitriding step, the first charge of pellets is moved downwardly to a second heat zone and the reactant temperature is increased to a maximum of 1650° C., preferably within a range of 1550° to 1600° C., and maintained within that temperature range for a time sufficient to convert the effective reactants to beta'-SiAlON. Concurrently with the movement of the first charge of pellets into the second heat zone, additional initial reactants are charged into the first heat zone. It is believed that some conversion of the effective reactants begins to occur at temperatures as low as 1200° C., but it has been discovered that if the temperature is increased, less time is required to effect an essentially complete conversion of the effective reactants to beta'-SiAlON. Within a range of 1550° to 1600° C. a time of heating of 1½ hours is sufficient to yield an essentially single phase beta'-SiAlON. Thus, the time of residence of the reactants in each heat zone can be controlled to be essentially the same and the process can be operated on a continuous batch-by-batch basis. In an alternate method of operating the process continuously, the initial reactants may be fed into the first heat zone at a rate suitable to traverse the first heat zone and effect the conversion to effective reactants. The effective reactants then move continuously into the second heat zone and traverse the second zone a time sufficient to convert the reactants to essentially beta'-SiAlON. It may be seen that the extent of the heat zones may be adjusted to insure that the pellets remain in each heat zone a sufficient length of time as they advance at a uniform rate. Although raising the temperature after nitriding is advantageous in effecting a conversion of the transitional or effective reactants into an essentially single phase beta'-SiAlON, raising the temperature above approximately 1650° C. promotes the formation of other SiAlON phases which is detrimental to the purposes of the invention.

During the final heating step after nitriding, a nitrogen atmosphere is maintained in the reactor to preserve a stoichiometric balance as expressed in the equation:

$$Si_3N_4 + Al_2O_3 + AlN \rightarrow beta'\text{-SiAlON}.$$

In the foregoing description the two-step nitriding and heating cycle of the reactants is accomplished successively and continuously in a vertical shaft reactor. If desired, the process may be interrupted after the initial nitriding step in making the effective reactants, and the effective reactants can then be transferred to an alternate reactor to make the ultimate conversion to beta'-SiAlON.

The following example is offered to illustrate the production of beta'-SiAlON by a process of this invention.

EXAMPLE 500 g of beta'-SiAlON having a formula $Si_2AlON_3$  were prepared from discrete particles of $Al_2O_3$, fumed $SiO_2$, petroleum carbon and an $Fe_2O_3$ catalyst.

The above-mentioned initial reaction particles of $Al_2O_3$, fumed silica and $Fe_2O_3$ were provided having median particle sizes as follows: $Al_2O_3$—approximately 1 micron, $SiO_2$—0.1 micron, and $Fe_2O_3$—2.5 microns. By reference to FIG. 1, the portions of reaction materials required to produce 500 g of $Si_2AlON_3$ were determined to be: 115 g $Al_2O_3$, 265 g $SiO_2$ and 120 g of carbon.

The reaction materials in the above-stated portions plus 2% or 10 g of $Fe_2O_3$ catalyst material were charged into a 4.9 liter ceramic ball mill where the materials were uniformly mixed. The resultant mixture was then mixed with enough water to render the mixture plastic, and pellets having dimensions of approximately 3.1 mm diameter × 18.75 mm length were produced by extruding.

The pellets were then dried to drive off excess water and were charged into an enclosed reactor vessel provided with an inlet below the pellet bed to permit uniform circulation of gaseous nitrogen through the pellets and an outlet near the top of the vessel to permit discharge of nitrogen and reaction gas products.

The vessel having the pellets therein was enclosed in a heating chamber and nitrogen was charged into the vessel at a pressure sufficient to maintain a flow of nitrogen through the vessel throughout the subsequent heating cycles.

When it was determined that the reaction vessel had been purged of air, temperature within the heating chamber was increased an amount necessary to raise the temperature of the pellets to 1400° C. and that pellet temperature was maintained for 1½ hours.

The pellet temperature was then increased to 1600° C. and maintained thereat for 1½ hours. The pellets were then cooled to room temperature and analyzed for composition. It was determined by X-ray diffraction that the processed material was comprised of beta'-$Si_2AlON_3$ in excess of 90% and $3Al_2O_3 \cdot 2SiO_2$ (mullite), alpha-Fe, SiC and other unidentified phases making up the balance.

While the invention has been described in terms of preferred embodiments, the claims appended hereto are intended to encompass other embodiments which fall within the spirit of the invention.

What we claim is:

1. A process for producing an essentially beta'-SiAlON refractory material, the process comprising:
   providing a uniform mixture of initial reactant materials as sources of $SiO_2$, $Al_2O_3$ and C in a reactor;
   nitriding said mixture at temperatures between 1200° C. and 1450° C. for a time sufficient to convert at least a portion of said initial reactants to at least a portion of effective reactants; and
   heating said effective reactants in the presence of nitrogen at temperatures from 1400° to 1650° C. for a time sufficient to convert said effective reactants to an essentially beta'-SiAlON refractory material.

2. The process according to claim 1 wherein heating said effective reactants in the presence of nitrogen is at temperatures from 1550° to 1600° C.

3. The process according to claim 1 wherein said $SiO_4$ initial reactant is selected from a group of materials consisting of quartz, cristabolite, tridymite and amorphous silica.

4. The process according to claim 1 wherein said $Al_2O_3$ initial reactant is selected from a group of materials consisting of aluminum carbonate, aluminum nitrate, aluminum hydroxide and gibbsite.

5. The process according to claim 1 wherein said silicon dioxide and aluminum oxide initial reactants are selected from a group consisting of:
   clay having a ratio of aluminum oxide to silicon dioxide as defined by points along line AB of FIG. 1;
   a coked mixture of rice hulls and clay, the mixture having a ratio of aluminum oxide to silicon dioxide as defined by points along line AB of FIG. 1; and
   a precipitate having a ratio of aluminum oxide to silicon dioxide as defined by points along line AB of FIG. 1.

6. A process according to claim 1 wherein the preferred median particle size of the $Al_2O_3$ initial reactant is less than 3.5 microns.

7. A process according to claim 1 wherein the preferred median particle size of the $Al_2O_3$ initial reactant is less than 1 micron.

8. The process according to claim 1 wherein effective reactants are $Si_3N_4$, AlN and $Al_2O_3$.

9. A process according to claim 1 wherein said nitriding includes providing nitrogen under a pressure sufficient to maintain a flow of nitrogen through the reactor.

10. A process according to claim 1 whereby essentially beta'-SiAlON is produced continuously by providing the initial reactants to a reactor for nitriding and heating at a rate commensurate with the rate of discharge of said beta'-SiAlON from the reactor.

* * * * *